No. 813,134. PATENTED FEB. 20, 1906.
C. H. ANDERSON.
CONVEYER.
APPLICATION FILED AUG. 8, 1904. RENEWED AUG. 4, 1905.
9 SHEETS—SHEET 1.
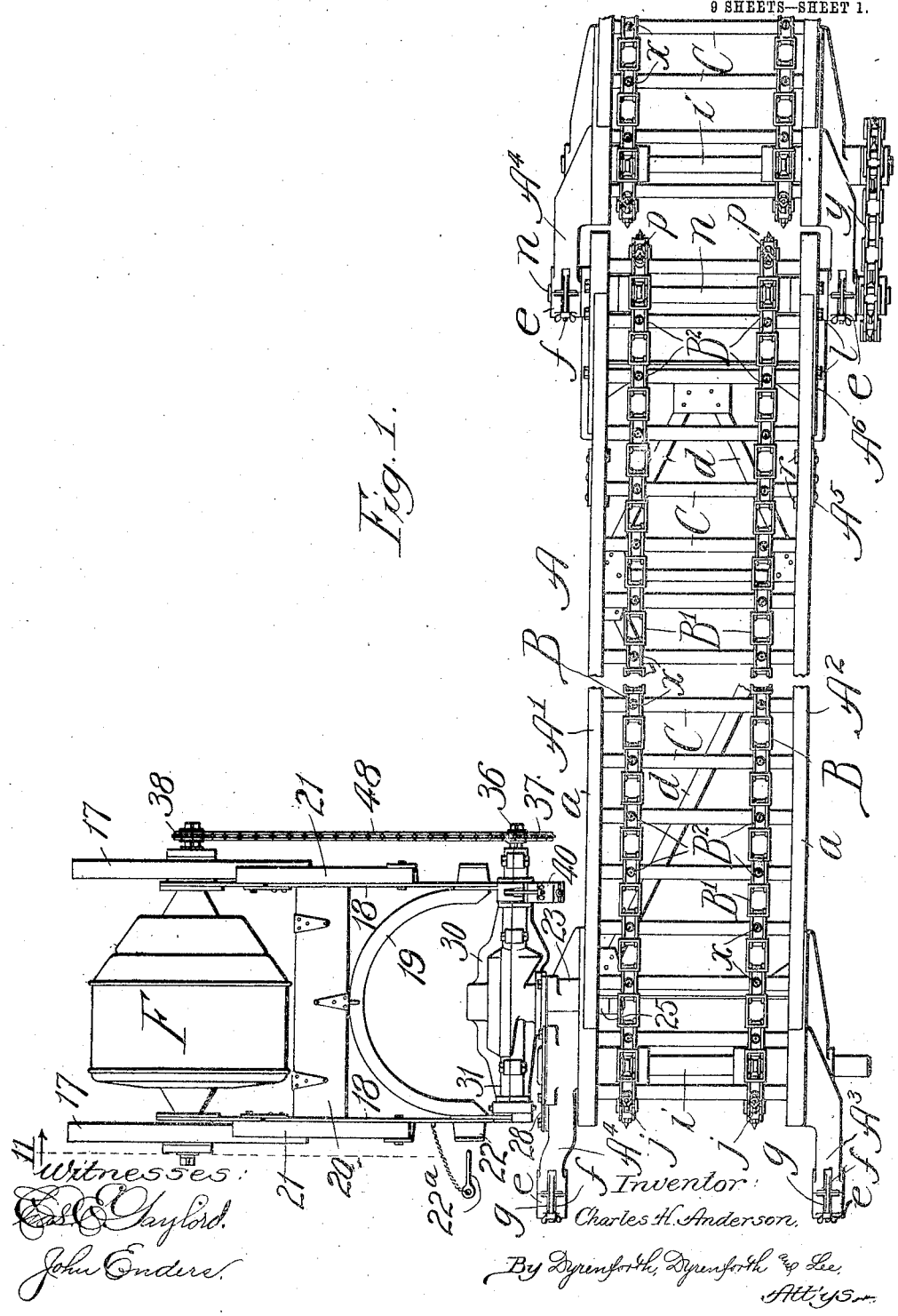
Witnesses:
Inventor:
Charles H. Anderson.
By Dyrenforth, Dyrenforth & Lee,
Att'ys

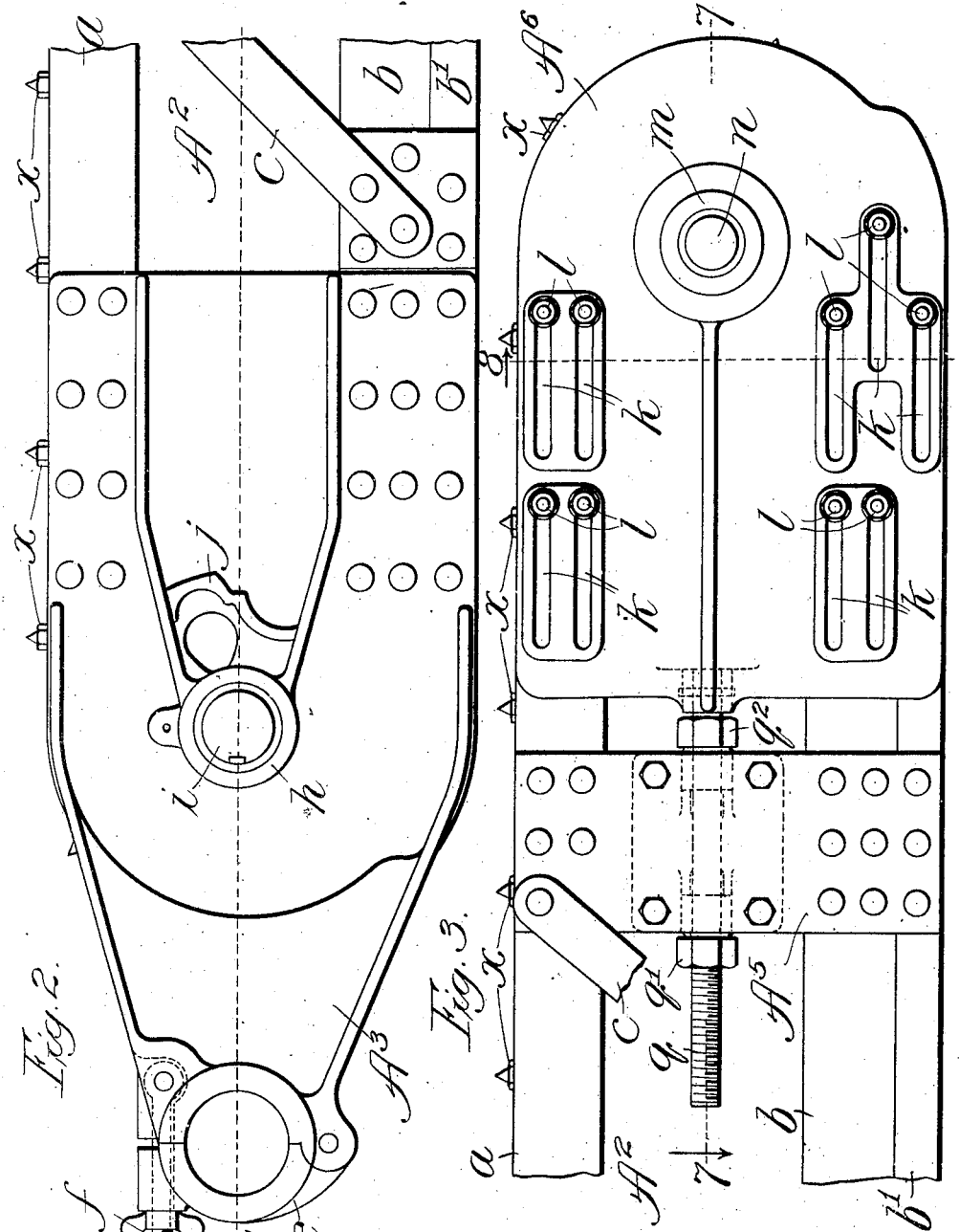

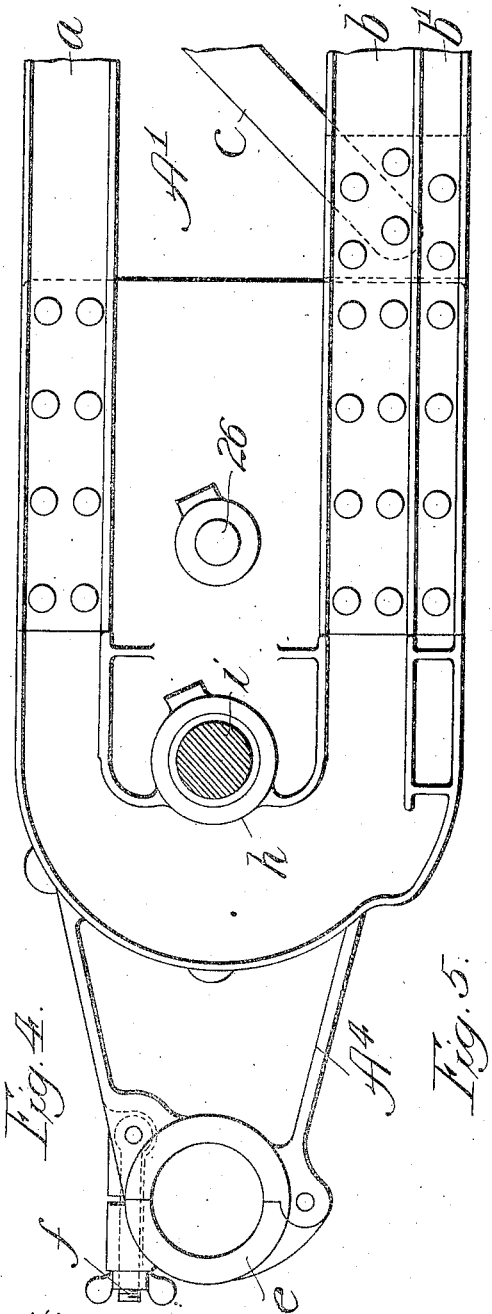
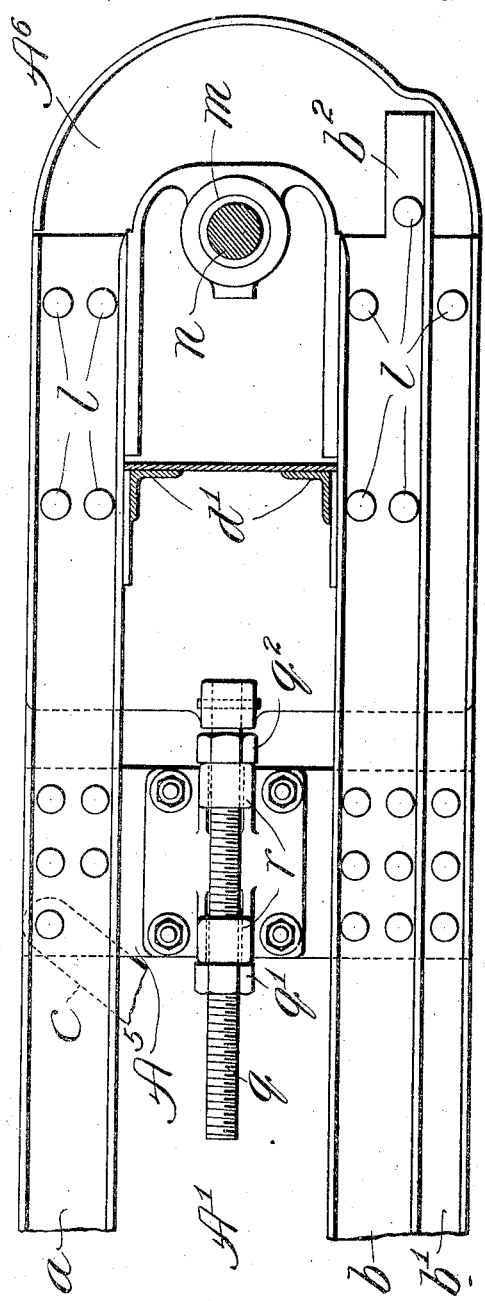

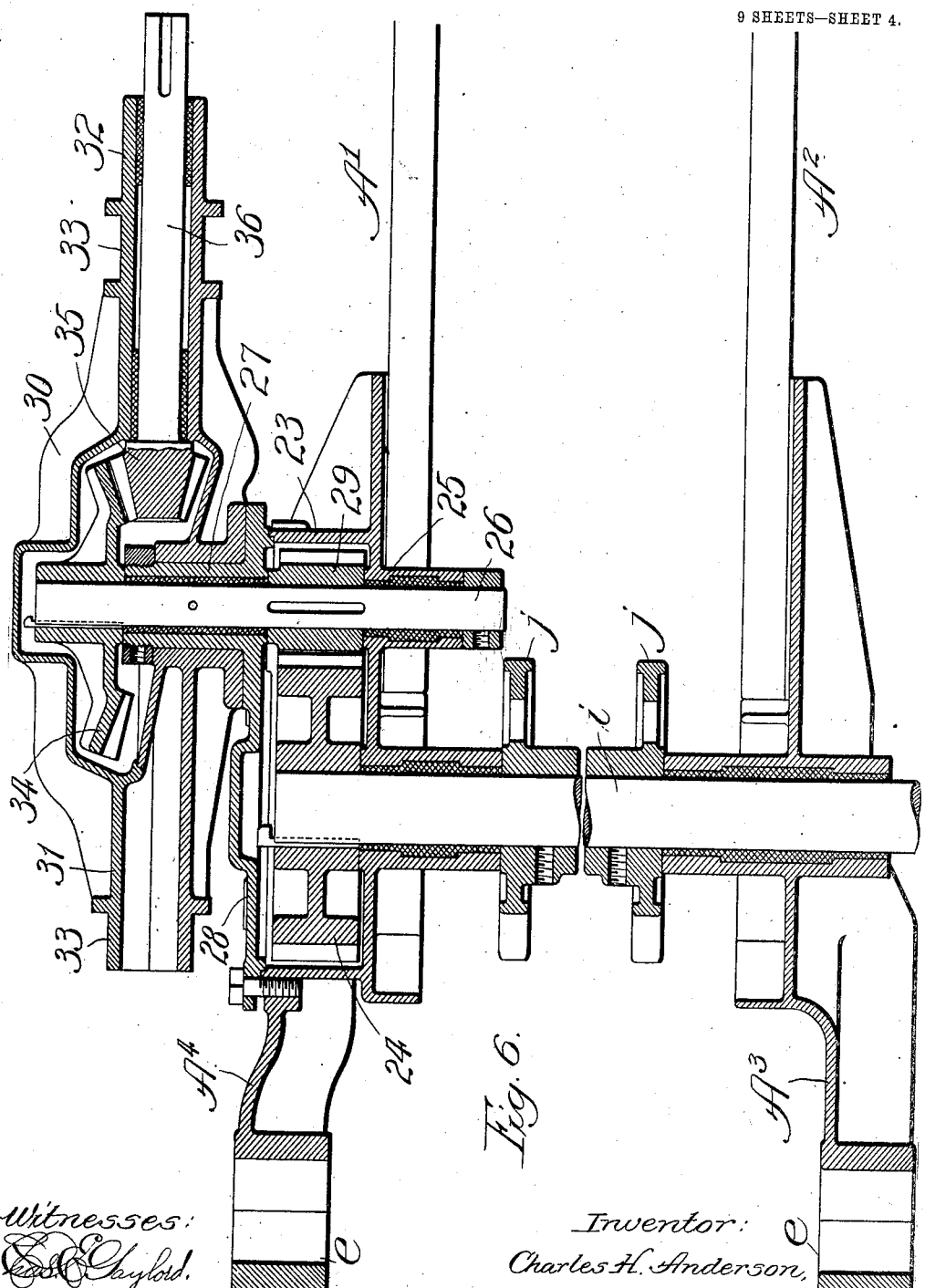

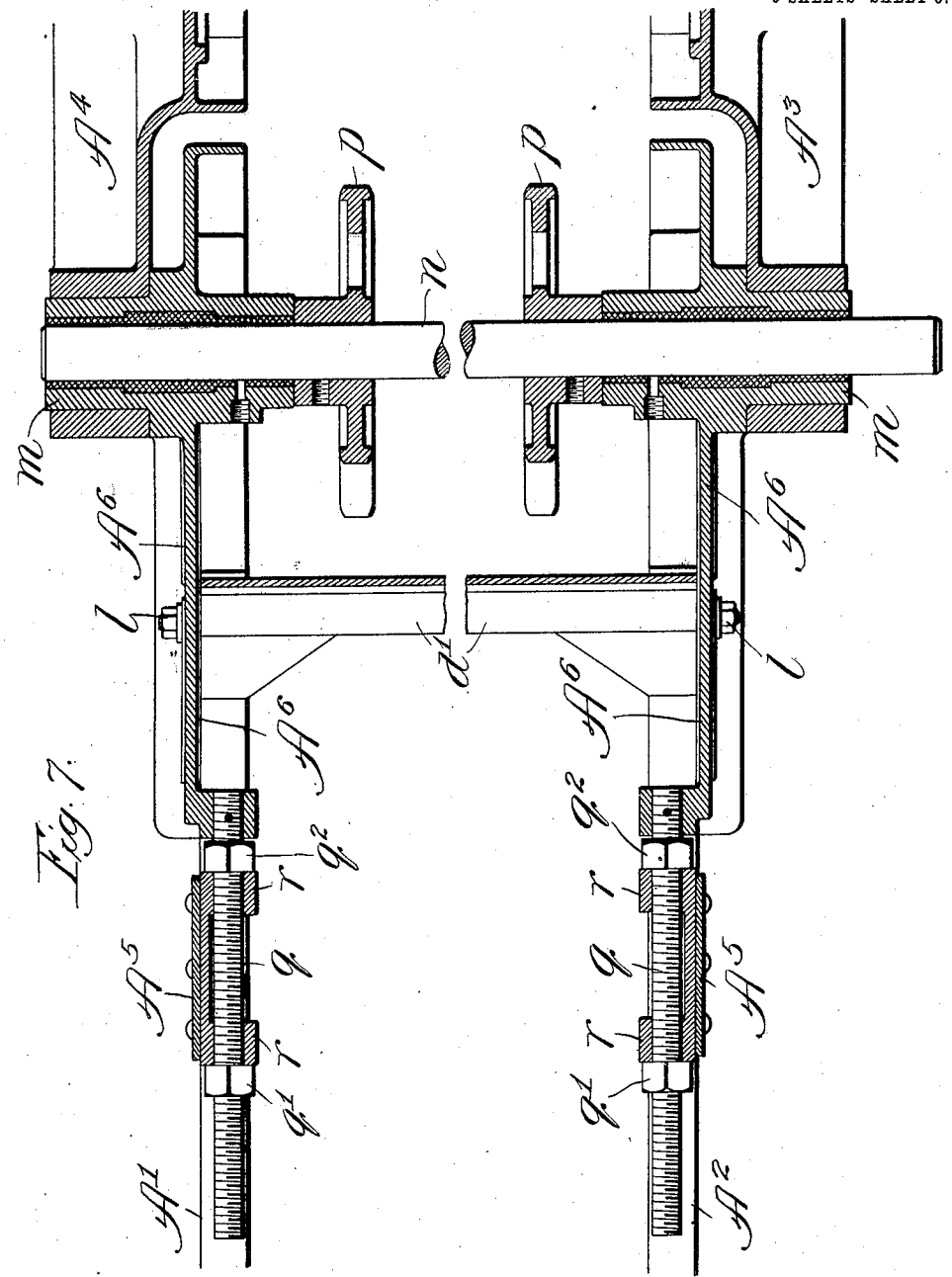

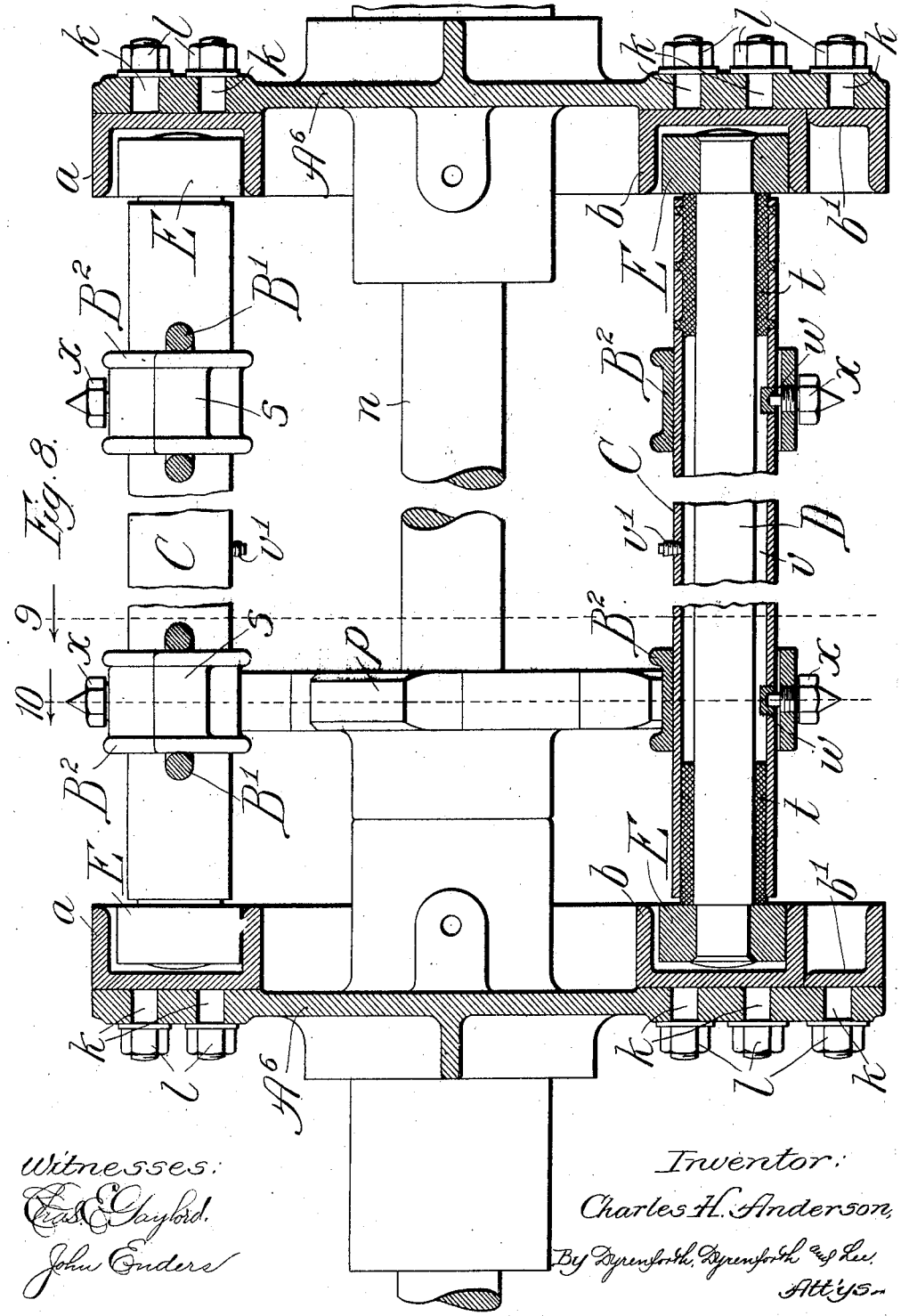

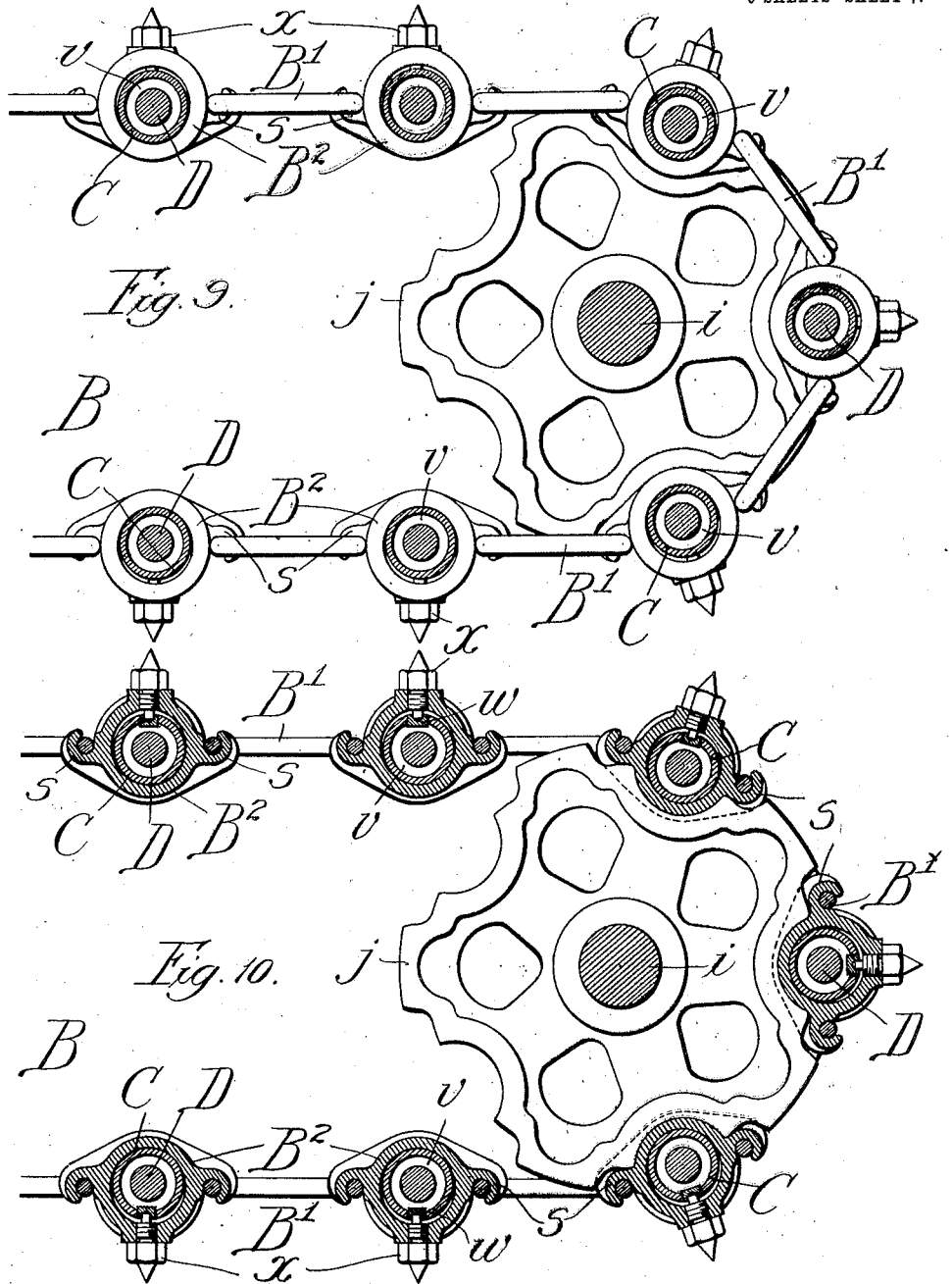

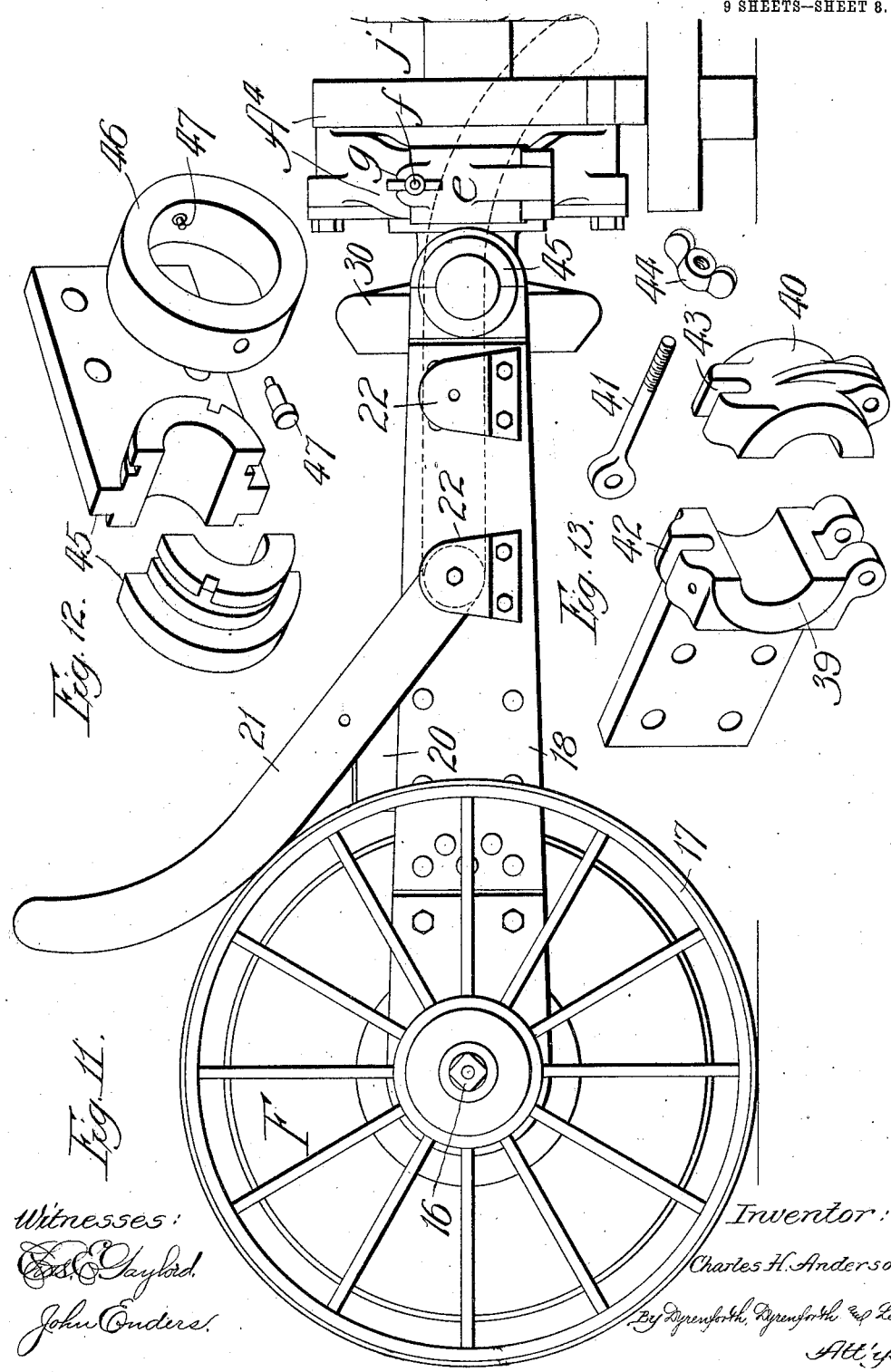

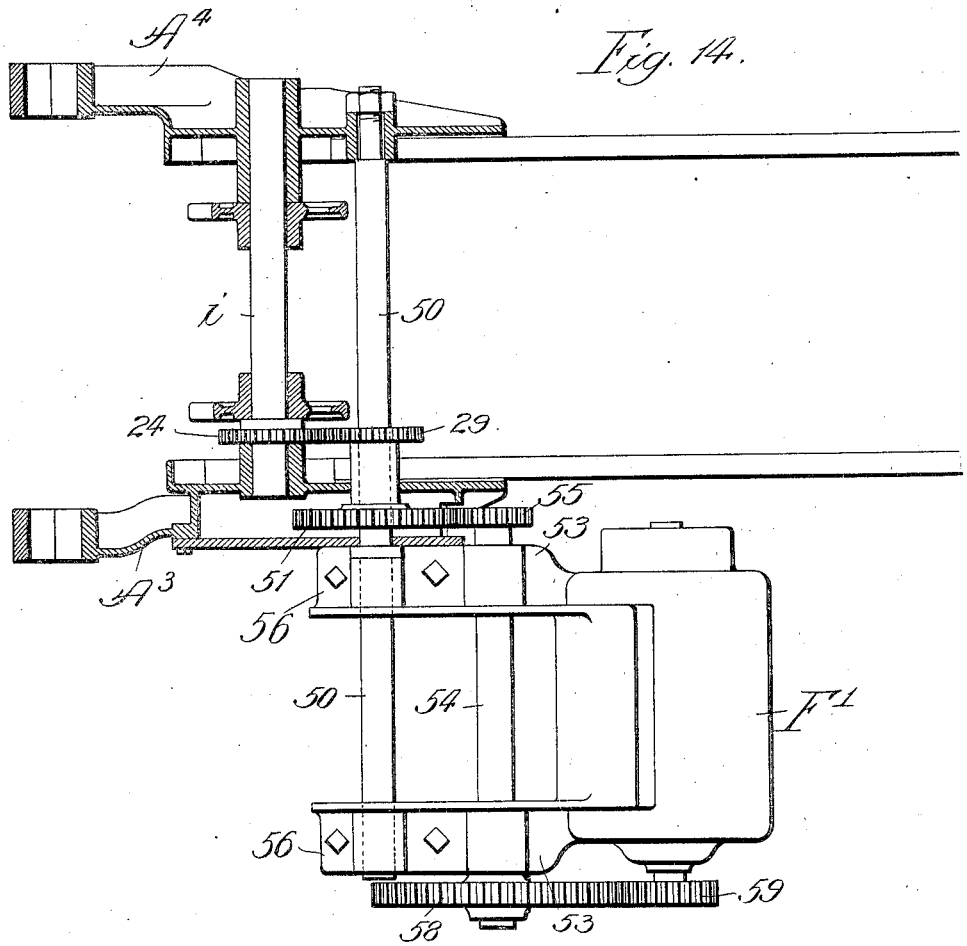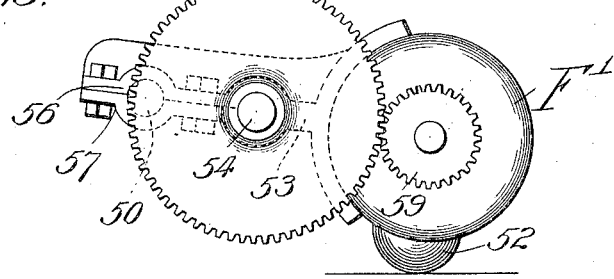

UNITED STATES PATENT OFFICE.

CHARLES H. ANDERSON, OF CHICAGO, ILLINOIS.

CONVEYER.

No. 813,134.   Specification of Letters Patent.   Patented Feb. 20, 1906.

Application filed August 8, 1904. Renewed August 4, 1905. Serial No. 272,796.

*To all whom it may concern:*

Be it known that I, CHARLES H. ANDERSON, a citizen of the United States, residing at Chicago, in the county of Cook and State of Illinois, have invented a new and useful Improvement in Conveyers, of which the following is a specification.

My invention relates to improvements in portable conveyers of the type shown and described in the application for Letters Patent filed by me January 21, 1904, Serial No. 189,991.

My present object is to provide certain improvements in the construction of the conveyer-sections as well as in the driving means therefor.

In the accompanying drawings, Figure 1 is a broken plan view showing parts of two conveyer-sections joined together in driving relation, one of the sections having connected therewith a readily-detachable electric-motor device of an improved construction; Figs. 2 and 3, enlarged broken side elevations of the opposite end portions, respectively, of one of my improved conveyer-sections; Figs. 4 and 5, longitudinal sections of the end portions shown, respectively, in Figs. 2 and 3; Fig. 6, a broken plan section taken on line 6 in Fig. 2; Fig. 7, a broken plan section taken on line 7 7 in Fig. 3; Fig. 8, an enlarged section taken on line 8 in Fig. 3; Figs. 9 and 10, broken sections taken, respectively, on lines 9 and 10 in Fig. 8; Fig. 11, a broken view showing my improved electric-motor device in side elevation; Figs. 12 and 13, perspective views, respectively, of the coupling means, on an enlarged scale, employed at opposite sides of the electric-motor frame for attaching it in driving relation to a shaft of a conveyer-section; Fig. 14, a broken partly-sectional plan view of one end portion of one of the conveyer-sections and showing coupled thereto an electric-motor device of modified construction; and Fig. 15, a side elevation of the motor device shown in Fig. 14.

Each conveyer-section is formed with the side beams or frames $A'$ $A^2$, built up of structural steel. They are formed with upper longitudinally-extending channel-bars $a$ and lower longitudinally-extending channel-bars $b$, the bars being tied together at each side by inclined braces $c$, disposed at suitable intervals. Riveted to the upper and lower channel-bars $a$ $b$ at one end of the section are ribbed end plates $A^3$ $A^4$, and near the opposite end of each side frame is a tie-plate $A^5$, also riveted to the upper and lower channel-bars. The side frames are held together by inclined cross-braces $d$ after the manner indicated in Fig. 1 and angle-iron braces $d'$, Fig. 5. The companion plates $A^3$ $A^4$ are formed at their ends with journal-boxes, each having a hinged cap $e$—as shown, for example, in Fig. 2—which cap when closed is fastened in place by means of a nut-bolt $f$, pivoted to the plate and resting in a groove $g$ in the cap. The end plates $A^3$ $A^4$ are bifurcated, as shown in Fig. 2, where they are riveted to the upper and lower channel-bars. At the junction of the forks of each plate is a bearing $h$ for a cross-shaft $i$, carrying a pair of sprocket-wheels $j$. At the opposite ends of the side frames $A'$ $A^2$, beyond the plates $A^5$, are companion longitudinally-sliding plates $A^6$, provided with longitudinally-extending sockets $k$, disposed as shown in Fig. 3, through which the said end plates $A^6$ are fastened by means of bolts $l$ to the upper and lower channel-bars and also to an angle-bar $b'$, extending below and parallel with each channel-bar $b$. The angle-bars $b'$ form the lower edges of the frame $A$, on which it rests when lying upon a floor. The end plates $A^6$ are formed with bearing-sleeves $m$ for a shaft $n$, carrying sprocket-wheels $p$, like the sprocket-wheels $j$, described. The end plates $A^6$ are connected to slide together by the shaft $n$, and they carry at their inner ends longitudinally-extending bolts $q$, passing through perforated ears $r$, fastened against the inner sides of the plates $A^5$. The bolts $q$ are fastened to the plates $A^6$ and are threaded and provided with nuts $q'$ $q^2$ to bear against the outer sides of the said ears $r$. The plates $A^6$, joined together as described, form a tensioning-frame for the endless carrier chains or belts B B, running over the companion sprocket-wheels $j$ and $p$. To tension the chains, the nuts $q'$ are loosened and the nuts $q^2$ are turned upon the bolts $q$ while bearing against the adjacent ears $r$ to force the tensioning-frame longitudinally outward, and when the chains are suitably tensioned the jam-nuts $q'$ may be tightened in place against the other ears $r$. To loosen the chains, the nuts $q^2$ are turned in the opposite direction to retract the tensioning-frame. The chains B B are formed of alternate links $B'$ and heads or attachments $B^2$, as illustrated most plainly in Figs. 9 and 10. The heads $B^2$ are short sleeves provided at opposite sides with hooks $s$, with which the links B' pivotally engage. The heads B² are upon tubes C, containing shafts D, which shafts at their opposite ends carry rollers E, traveling in the channel-bars $a$ $b$. In opposite ends of the tubes C are bushings $t$, forming journal-bearings for the shafts D, and between the bushings in each tube C is an annular oil-chamber $v$, which may be filled through an opening provided with a screw-plug $v'$. Threaded into each tube C are socket-pieces $w$, engaged by pins $x$, fastened through the heads B². The pins $x$ may be in the form of spikes, as shown, to engage packages to be conveyed by the chains, as hereinafter described. The bushings $t$ are formed by pouring Babbitt metal or the like into the tubes while the shafts are in place, and they thus form journal-bearings which fit very close around the shafts. The plugs $v'$ and $w$ operate to retain the oil in the chambers $v$, so that none thereof can escape except to lubricate the shaft-bearings. This construction of self-lubricating shafts is a very desirable feature of my present conveyers.

In describing the chains B as formed of alternate links B' and heads B², I do not wish to be limited to the employment of only one link B' in each case, because it is obvious that two or more links B' in tandem may be interposed between the heads B² along each chain, whereby the heads will alternate with sets of links B' instead of single links.

The shaft $n$ extends beyond its bearing $m$ at one side, (see Fig. 7,) and a section A, placed end to end with the one described, may be coupled thereto by causing it at its bearing-caps $e$ to pivotally engage the sleeves $m$, as shown in Fig. 1. The second section A may be driven from the first said section by a chain $y$, running around sprocket-wheels on the shaft $n$ of the first section and the shaft $i$ of the second section. When it is desired to separate the sections, the bearing-caps $e$ are loosened and swung out of the way and the belt $y$ disconnected in a common manner. Thus it will be seen that sections may be connected together in driving relation or disconnected from each other very readily.

When the carrier, consisting of the belts B and attendant parts, is driven, as hereinafter described, it moves with the rollers E in the guides or channel-bars $a$ $b$, whereby the chains are maintained against sagging and move with a minimum degree of friction. To guide the rollers E as they move around the sprocket-wheels into the lower channel-bars $b$, the ends of the latter are extended, as shown at $b^2$, Fig. 5. Thus the ends of the lower channel-bars are beyond the path of the rollers, and the latter move into the channel-bars without meeting any obstruction.

In my aforesaid pending application I described and claimed means for driving the conveyer-belts of the sections in the form of a detachable and replaceable electric motor, the connecting means between the motor and conveyer-shaft being such that one may be at any desired angle to the other. In the use of my conveyers it is necessary in most cases that they shall be portable, whereby they may be placed in any desired position in a warehouse, upon a wharf, or wherever they are to be employed. To render them readily portable, it is necessary that they shall be in attachable and detachable sections, as described, so that any number of sections to form a conveyer of any desired length may be employed. By using as the driving means for the conveyers one or more readily attachable and detachable electric motors the conveyers may be driven by electric power, thus doing away with line-shafting, &c. Furthermore, the motors may be connected to any of the sections in the most convenient location and at any angle thereto to conform to the immediate surroundings. In the present case I show electric motor devices of preferred and modified constructions either one of which may be employed in place of the construction shown in my aforesaid pending application.

In the construction shown in Figs. 1 and 11 the field of the motor F is upon trunnions or an axle 16, supported in the hubs of wheels 17. Forming a part of the motor device is a truck-frame consisting of side bars 18 18, pivotally connected with the axle, a curved brace-bar 19, connecting the free ends of the side bars, and another brace, which may be a tool-box 20. Pivotally connected with the outer sides of the bars 18 are swinging extensions or handles 21, which move into socket-pieces 22 on the sides of the bars and may be fastened down by removable pins 22ª, passing through coincident openings in the said socket-pieces and handles. This truck construction permits the motor device to be moved from place to place very readily.

In the preferred construction the end plate A⁴ of the carrier-section A forms a box or housing 23, containing a gear-wheel 24, keyed to the shaft $i$. The box 23 has a journal-bearing 25 for a counter-shaft 26, which is also journaled in a sleeve 27 on a cap or covering plate 28 for the box. The shaft 26 carries a pinion 29 in the box, meshing with the gear 24. Mounted upon the sleeve 27 to rock thereon is a frame or gear-case 30, formed with arms 31 and 32, presenting annular bearings 33 33, as indicated in Fig. 6. The frame 30 forms a housing for a bevel gear-wheel 34, keyed to the shaft 26, and for a bevel-pinion 35, meshing with the gear-wheel 34 and carried by a shaft 36, journaled in the tubular arm 32 and forming the primary drive-shaft of the conveyer-section. The shaft 36 carries a sprocket or belt-pulley 37, and on the armature-shaft of the motor F is a sprocket or belt pulley 38.

On the free end of one of the side bars 18 of the motor-truck is a split bearing-box, comprising the section 39, section or cap 40, hinged to the section 39, and means for fastening the sections together when closed, comprising a bolt 41, hinged in a groove 42 in the section 39, to rest in a groove 43 in the section 40 and carrying a nut 44, by which the parts may be fastened together when closed. This construction is substantially the same as the means described for joining the conveyer-sections together. On the other side bar 18 of the truck is a split bearing-box 45, of the construction shown in Fig. 12, the sections of the box being joined together by a removable ring 46, which may be held against slipping off by pins 47. When it is desired to couple a motor to a conveyer-section, the truck is wheeled to a position at right angles to the conveyer, its handles 21 are lifted to the position shown by full lines in Fig. 11, and the boxes at the free ends of the side plates 18 are caused to engage the surfaces 33 on the rocking housing-frame 30. The cap 40 at one side is closed and fastened in place, as described, and the parts 45 are joined together by the ring 46. The driving chain or belt 48 is then passed over the pulleys 37 38. When the motor is started, its pulley 38 drives the pulley 37 and shaft 36 and through the gearing described rotates the shaft $i$, and consequently drives the carrier, formed of the belts B, shafts, and rollers E, all as described. The side bars 18 pivotally engage the arms 31 32, and the gear case or frame 30 may swing to any angle with relation to the carrier-frame. Thus the motor device may rest at any elevation within short limits with relation to the carrier-frame and at any angle thereto to accommodate itself to the surroundings.

In the construction shown in Figs. 14 and 15 a stationary shaft 50 extends entirely across the conveyer-section and is fastened in the side frames thereof, as indicated. On the shaft 50 is a sleeve which carries a gear-wheel 51 and a pinion 29, meshing with the gear 24 on the shaft $i$. The housing or gear-case forming part of the end plate $A^3$ is shaped to accommodate a straight gear 51 in place of the bevel-gear 34 of the other construction. The motor F' has a casing on the under side of which is a hemispherical projection or rest 52. On the motor-casing are arms 53, forming a bearing for a cross-shaft 54, carrying a pinion 55. The free end portions of the arms 53 carry boxes 56, each formed with a removable section 57 and adapted to pivotally engage the shaft 50. The motor is connected to the carrier-section by attaching it at the bearings 56 to the shaft 50. The pinion 55 is thus caused to engage the gear 51, and the shaft 54 is driven by the gear 58 thereon, which meshes with a pinion 59 on the motor-shaft. The connection between the motor device and the shaft 50 is pivotal, as stated, and as the motor may rest at any angle upon the base 52 it may extend at any angle and accommodate itself to the surroundings, the same as the motor of the preferred construction.

What I claim as new, and desire to secure by Letters Patent, is—

1. In a conveyer, a conveyer-frame having sides each constructed with mutually-braced parallel upper and lower channel-bars forming guides, shafts journaled toward opposite ends of the frame, sprockets on said shafts, endless parallel conveyer-chains, extending around said sprockets, formed of alternate heads and links pivotally connected together, an endless series of transverse tubes connected toward opposite ends with the heads of the respective chains, shafts passing through and journaled in said tubes and movable at their ends in said guides, and driving means for the chains.

2. In a conveyer, a conveyer-frame having sides each constructed with mutually-braced parallel upper and lower channel-bars forming guides, shafts journaled toward opposite ends of the frame, sprockets on said shafts, endless parallel conveyer-chains, extending around said sprockets, formed of alternate heads and links pivotally connected together, an endless series of transverse tubes connected toward opposite ends with the heads of the respective chains, shafts passing through and journaled in said tubes, rollers on the ends of said shafts traveling in said guides, and driving means for the chains.

3. In a conveyer, a conveyer-frame having sides each constructed with mutually-braced parallel upper and lower channel-bars forming guides, shafts journaled toward opposite ends of the frame, sprockets on said shafts, endless parallel conveyer-chains, extending around said sprockets, formed of alternate heads and links pivotally connected together, an endless series of transverse tubes connected toward opposite ends with the heads of the respective chains, shafts passing through and journaled in said tubes provided at their ends with rollers moving in said guides, the lower said guides having extended portions to receive and direct the rollers into the lower guides, and driving means for the chains.

4. In a conveyer, an endless carrier comprising parallel chains formed with alternate links and heads, an endless series of transverse tubes connected toward opposite ends with the heads of the respective chains, and shafts extending through and beyond the ends of said tubes and journaled toward opposite ends in bearings in the tubes, the tubes forming oil-receptacles between the bearings therein.

5. In a conveyer, an endless carrier comprising parallel chains formed with alternate links and heads, an endless series of transverse tubes extending toward opposite ends through the heads of the respective chains, pins fastening the tubes in the heads, shafts extending through and beyond the ends of said tubes and journaled toward opposite ends in bearings in the tubes, and guides for the ends of said shafts.

6. In a conveyer, the combination with a portable conveyer-frame, an endless traveling carrier thereon, and a drive-shaft on said frame for the carrier, of operating means therefor comprising a separately-portable electric motor having a frame, and means for pivotally connecting together and disconnecting said conveyer and motor-frames, substantially as and for the purpose set forth.

7. In a conveyer, the combination with a portable conveyer-frame, an endless traveling carrier thereon, and a drive-shaft on said frame for the carrier, of operating means for the carrier comprising a separately-portable electric motor, a wheeled truck-frame on which said motor is mounted, and means for pivotally connecting together and disconnecting said conveyer-frame and truck-frame, substantially as and for the purpose set forth.

8. In a conveyer, the combination with a portable conveyer-frame, an endless traveling carrier thereon, and a drive-shaft on said frame for the carrier, of operating means for the carrier comprising a separately-portable motor, hollow trunnions on the motor-casing through one of which the armature-shaft extends, truck-wheels journaled on said trunnions, a truck-frame pivoted to said trunnions, means for pivotally connecting together and disconnecting said conveyer-frame and truck-frame, and a detachable drive-belt connecting the armature-shaft and carrier drive-shaft.

9. In a conveyer, the combination with a portable conveyer-frame, an endless traveling carrier thereon and a shaft at one end of said carrier for driving the same, of a gear on said shaft, a counter-shaft journaled on the frame and having a pinion engaging said gear, a bevel-gear on said counter-shaft, a swinging frame pivotally mounted about the counter-shaft having attaching-arms, a drive-shaft extending through one of said arms and carrying a bevel-pinion meshing with said bevel-gear, and operating means for the carrier comprising a separately-portable motor, a wheeled truck-frame on which said motor is mounted, means for pivotally connecting said truck-frame to the said arms, and a detachable driving connection between the said motor and drive shaft.

CHARLES H. ANDERSON.

In presence of—
 WALTER N. WINBERG,
 F. M. WIRTZ.